United States Patent [19]
Newby, Sr.

[11] Patent Number: 6,123,893
[45] Date of Patent: *Sep. 26, 2000

[54] PROCESS OF MAKING A CARRYING CASE WITH INSERTED NAMEPLATE BY BLOW MOLDING

[75] Inventor: John Parks Newby, Sr., Raleigh, N.C.

[73] Assignee: Delta Consolidated Industries, Raleigh, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/876,121

[22] Filed: Jun. 13, 1997

Related U.S. Application Data

[62] Division of application No. 08/588,017, Jan. 17, 1996, Pat. No. 5,685,451.

[51] Int. Cl.⁷ .................................................. B29C 49/20
[52] U.S. Cl. .......................................... 264/516; 264/509
[58] Field of Search ..................... 264/509, 516

[56] References Cited

U.S. PATENT DOCUMENTS

| | | |
|---|---|---|
| 205,335 | 6/1878 | Arnold . |
| 1,188,078 | 6/1916 | Jones . |
| 1,545,955 | 7/1925 | Goertz . |
| 2,304,340 | 12/1942 | Dahlin . |
| 2,464,524 | 3/1949 | Nathan . |
| 2,577,350 | 12/1951 | Morin . |
| 2,819,494 | 1/1958 | Morin . |
| 2,959,812 | 11/1960 | Allen . |
| 3,207,822 | 9/1965 | Makowski . |
| 3,339,781 | 9/1967 | Schurman et al. . |
| 3,443,005 | 5/1969 | Barun . |
| 3,456,913 | 7/1969 | Lutz . |
| 3,474,498 | 10/1969 | Hoppes ................................... 264/509 |
| 3,490,805 | 1/1970 | DiPierro et al. . |
| 3,550,197 | 12/1970 | Szajna et al. . |
| 3,596,794 | 8/1971 | Peters . |
| 3,730,576 | 5/1973 | Schurman . |
| 3,736,201 | 5/1973 | Teraoka ................................... 264/516 |
| 3,785,217 | 1/1974 | Peura . |
| 3,828,969 | 8/1974 | Schurman . |
| 3,981,233 | 9/1976 | Nugarus . |
| 4,110,390 | 8/1978 | Olcott et al. . |
| 4,205,762 | 6/1980 | Wolfseder . |
| 4,244,612 | 1/1981 | Schurman . |
| 4,340,139 | 7/1982 | Wilcox et al. . |
| 4,423,000 | 12/1983 | Teraoka ................................... 264/524 |
| 4,611,713 | 9/1986 | Byrns . |
| 4,662,515 | 5/1987 | Newby, Sr. . |
| 4,680,837 | 7/1987 | Rubinstein . |
| 4,744,445 | 5/1988 | Anderson et al. . |
| 4,777,931 | 10/1988 | Ziegler et al. . |
| 4,784,817 | 11/1988 | Towns et al. . |
| 4,802,295 | 2/1989 | Darr . |
| 4,917,413 | 4/1990 | Jason et al. . |
| 5,100,204 | 3/1992 | Makihara et al. . |
| 5,114,522 | 5/1992 | Takado et al. . |
| 5,139,294 | 8/1992 | Ward et al. . |
| 5,194,305 | 3/1993 | Shirahata et al. . |
| 5,344,038 | 9/1994 | Freeman et al. . |

FOREIGN PATENT DOCUMENTS

| | | |
|---|---|---|
| F5942B/26 | 6/1979 | European Pat. Off. . |
| CH-614-010 | 8/1975 | Germany . |
| 56-126133 | 10/1981 | Japan ................................... 264/516 |
| 62-255119 | 11/1987 | Japan ................................... 264/516 |
| 63-212528 | 9/1988 | Japan ................................... 264/516 |
| 2-47034 | 2/1990 | Japan ................................... 264/516 |

OTHER PUBLICATIONS

Sales brochure for Sears Craftsman® lawn mowers; Sears, Roebuck & Co., 1988.
5 color photographs of Sears Craftsman Lawn Mower Engine Shroud (1988).

*Primary Examiner*—Catherine Timm
*Attorney, Agent, or Firm*—Myers Bigel Sibley & Sajovec

[57] ABSTRACT

A double-walled thermoplastic article includes a double-walled body having inner and outer walls and an insert having visible portions and recessed runner sections. The body includes an insert portion in which its inner and outer walls are contiguous. The insert is attached to the body insert portion such that the visible portions of the insert are exposed and the runner sections are embedded within the insert portion. The article can be produced by a double-walled blow molding process.

23 Claims, 7 Drawing Sheets

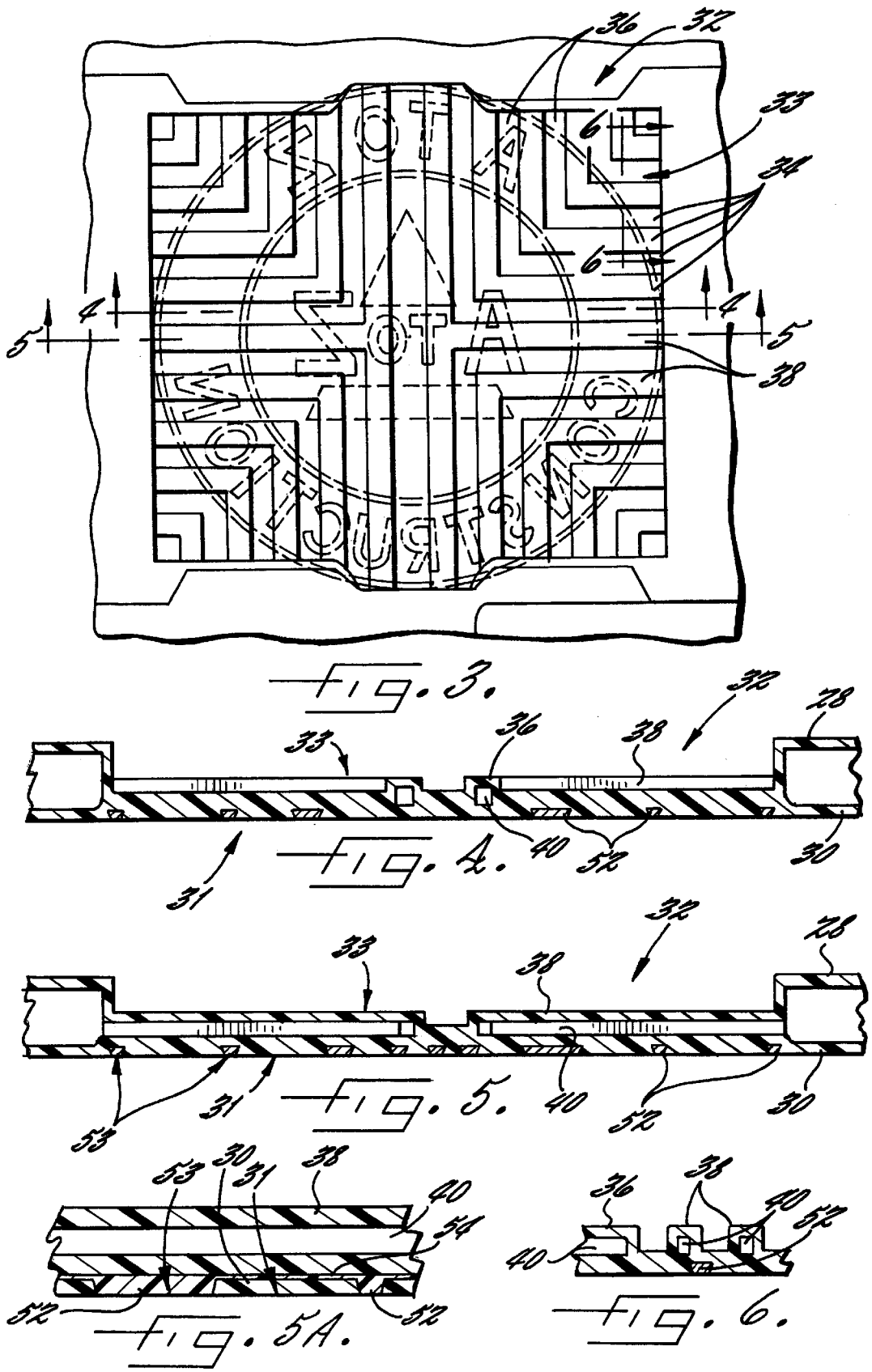

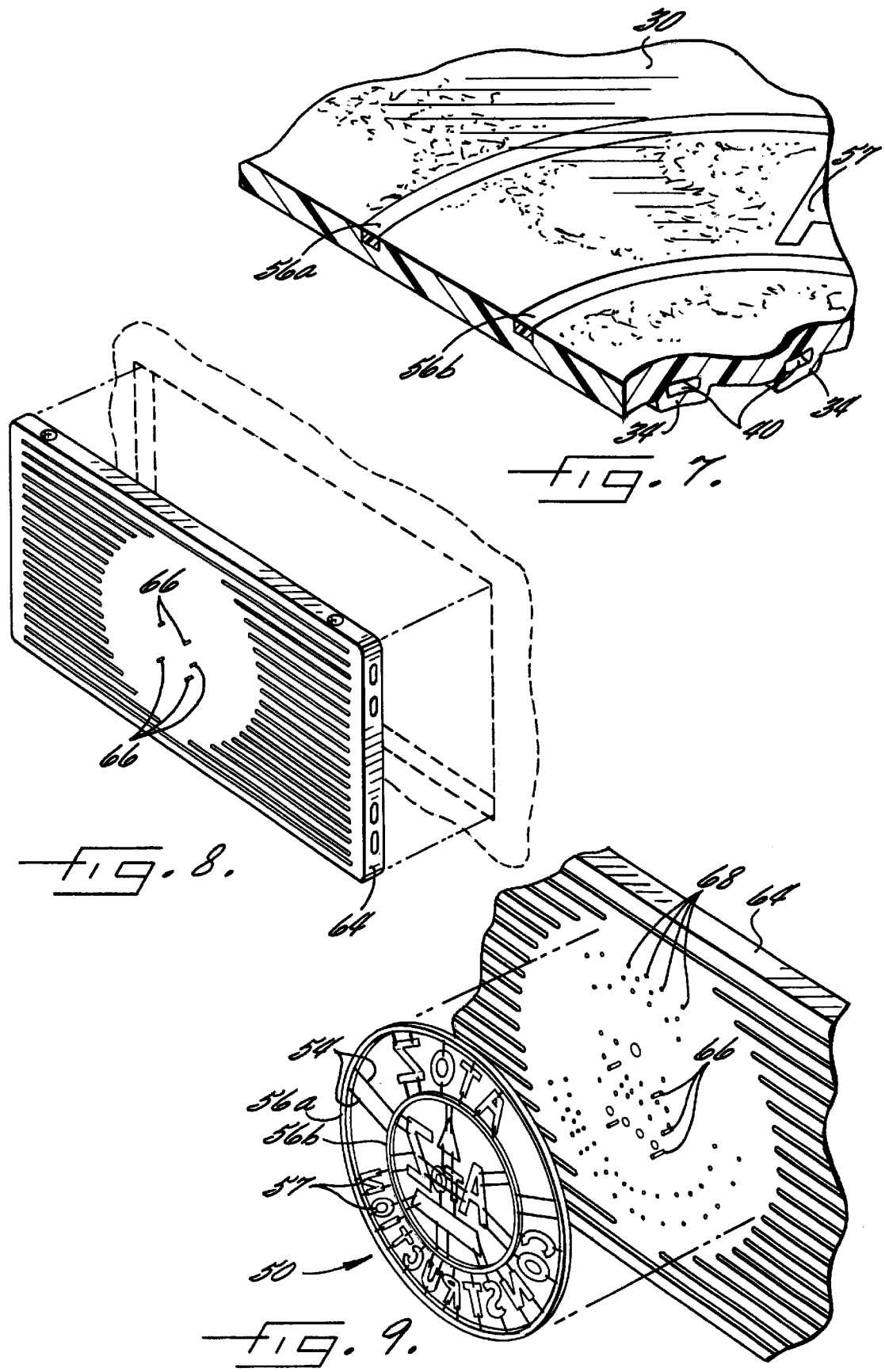

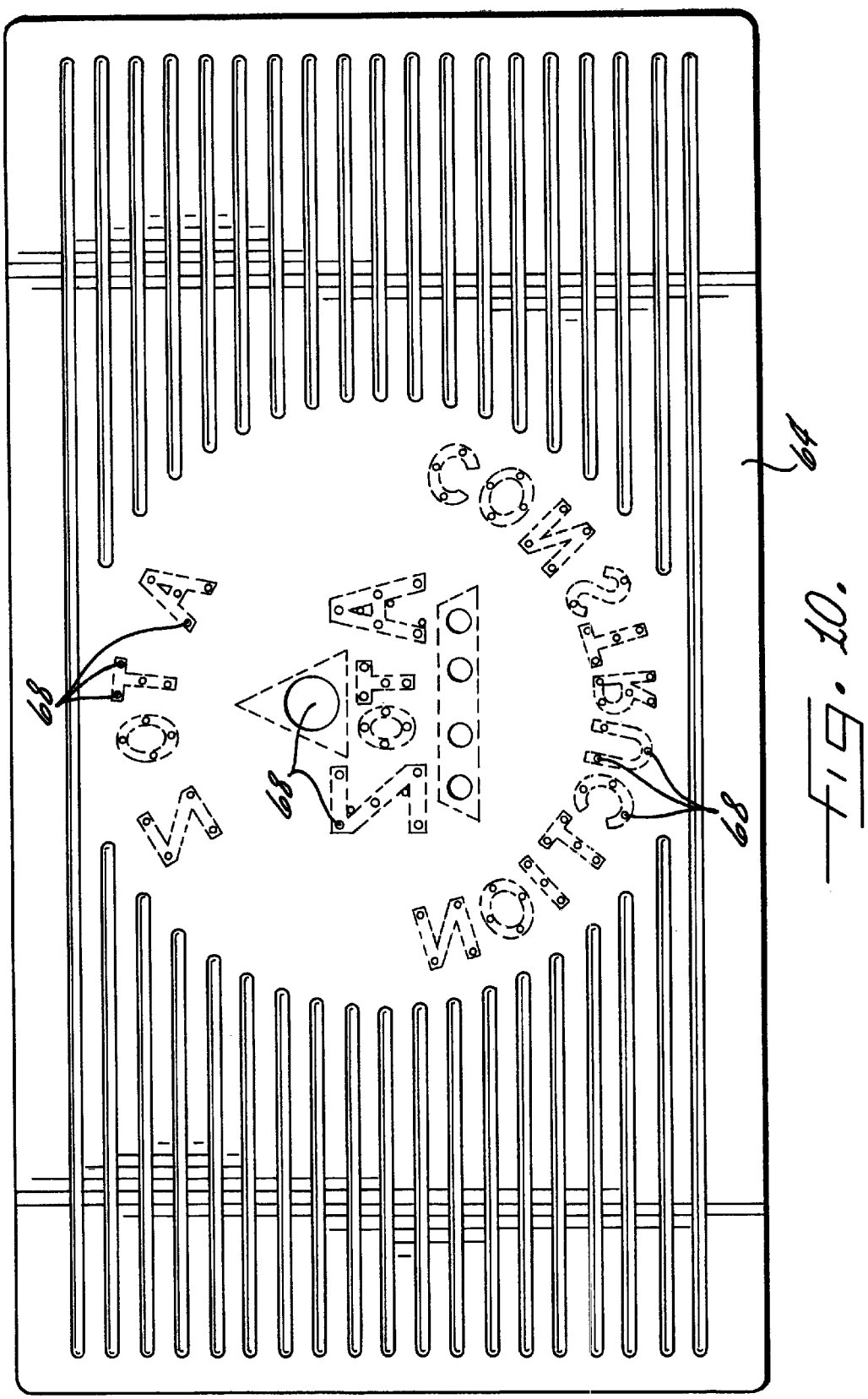

PROCESS OF MAKING A CARRYING CASE WITH INSERTED NAMEPLATE BY BLOW MOLDING

This application is a divisional of application Ser. No. 08/588,017, filed Jan. 17, 1996 now U.S. Pat. No. 5,685,451.

FIELD OF THE INVENTION

This invention-relates generally to blow-molded articles, and relates more specifically to blow-molded articles of double-walled construction.

BACKGROUND OF THE INVENTION

Blow molding is a well-known fabrication method for thermoplastic components. The process generally involves the molding of a hollow tube, or "parison," of molten thermoplastic, that is lowered from an overhanging extrusion head to a position between halves of a reciprocating mold. As the mold halves close, air or some other gas is injected into the parison; the increase in air pressure within the parison caused by such injection forces its walls into the contours of the cavities of the mold halves and thus forms the parison into a desired molded shape. The resulting component has molded walls that surround a hollow chamber. Blow molding has proven to be particularly popular for the production of large parts that would require unduly large molding injection molding machines.

One type of blow molding that has been used successfully for large components that require structural rigidity is the so-called "double-walled" blow molding process. In this process, mold halves are most often designed as distinct core and cavity halves (rather than as two cavities, as would be the case for blow-molded bottles or other containers). The core portion of the core mold half extends within the cavity as the mold halves close. In addition, the mold halves for double-walled components are configured so that the molded components have "full-perimeter flash"; i.e., after molding the component has excess material, or "flash", around the perimeter defined by mating surfaces of the mold halves. This contrasts with single-walled components, in which the parison is inflated entirely within closed mold cavities, and the molded component has flash only on its top and bottom portions. Blow-molded components have distinct inner and outer walls that surround a hollow space, with the inner wall having been formed by the core and the outer wall having been formed by the cavity, with the inner and outer walls being separated by the weld line remaining after the flash is removed. In a typical double-walled component the inner and outer walls are positioned proximate to one another and can have "pinched-off" areas, in which the inner and outer walls are contiguous.

One distinct advantage provided by double-walled blow-molded components is the capability for adjacent regions of the inner and outer walls to differ significantly in their localized contour. For example, a region of the outer wall may have a relatively flat profile, while the adjacent region of the inner wall can contain numerous projections, recesses, and the like, with the profile of either localized region failing to impact significantly the appearance or structural integrity of the other. Such differences in localized inner and outer wall contour are less likely to be successfully achieved in injection-molded components because the inclusion of substantial detail in the inner wall can have a deleterious effect on the dimensional stability, appearance, and even strength of the outer wall. Another performance advantage conveyed by double-walled components stems from the formation of the hollow chamber within the inner and outer walls, as it can provide an air cushion that protects items contacting the inner wall.

For these reasons, double-walled components have proven to be particularly popular for protective containers and carrying cases. Detailed contour that mates with, matches, supports, or captures portions of an item to be carried within the carrying case can be included in the inner wall of the double-walled component even as the outer wall has a generally flat, appearance-sensitive surface. Further, the air cushion between the inner and outer walls helps to protect the item. Thus, the container has the detail and structure necessary to support, transport and protect the item and also provides the desired aesthetic appeal, and does so without the manufacturer having to produce two separate inner wall and outer wall parts.

One problem confronting manufacturers of double-walled containers is the attachment of a manufacturer's label to the container. Typically, a paper or plastic label is adhesively bonded or otherwise attached to the outer surface of the one side of the container. However, these labels can easily peel off or tear, either of which can adversely impact the appearance of the container. The lack of durability of these labels is particularly problematic for carrying cases for power tools and the like, which are typically subjected to significant abuse during conventional use. Another alternative is to mold the manufacturer's logo directly into the case, but this limits the manufacturer to using a logo which is the same color as the case itself.

In view of the foregoing, it is an object of the present invention to provide a double-walled container with a durable identifying label.

It is also an object of the present invention to provide a method for producing a double-walled container having a durable identifying label.

It is a further object of the present invention to provide a mold suitable for producing a double-walled container with a durable identifying label.

SUMMARY OF THE INVENTION

These and other objectives are satisfied by the present invention, which includes a thermoplastic article having a molded-in insert suitable for use as an identifying label. The thermoplastic article comprises a double-walled body formed of a thermoplastic material and having outer and inner walls and a molded-in insert. The body includes an insert portion in which the inner and outer walls are at least partially contiguous. The insert, which is preferably thermoplastic, has outer surfaces defining one or more visible portions of the insert. The insert also includes runner sections connecting the visible portions which are recessed from the insert outer surface. The insert is attached to the body insert portion such that the insert outer surface is exposed (and thus visible) and the runner sections are embedded in the body insert portion. The resulting article has a durable visible insert that can withstand abuse similar to that withstood by the article itself. Preferably, the article includes ribs protruding outwardly from the body inner wall, which can assist the insert portion and insert in remaining generally flat.

Such an article can be formed by a method which includes as a first step providing a mold comprising a pair of mating mold halves. A first of the mold halves includes a cavity portion having a first insert section, and a second of the mold halves includes a core portion having a second insert section. Next, an insert such as that described above is positioned within the insert section of the cavity portion of the first mold half so that the insert outer surface contacts the insert section and so that the runner sections of the insert are spaced away from the insert section. A molten thermoplastic parison is then lowered between the mold halves, and the mold halves are closed to capture a portion of the parison therebetween so that the core portion of the second mold half extends within the cavity portion of the first mold half. The parison is inflated to force the parison to contact the core and cavity portions of the mold halves such that an insert portion is formed in the article which includes the insert and in which the inner and outer walls of the article are at least partially contiguous. As described above, the insert is positioned within the insert portion such that the insert visible portions are exposed in the outer wall and the runner sections are embedded within the article insert portion. Preferably, the method further comprises venting air from the cavity portion at positions adjacent the visible portions of the insert, as doing so can improve material' flow over the runner sections of the insert.

A mold that can be employed to form an article of the present invention comprises a pair of mating mold halves, a first of which includes a cavity portion having a first insert section, and a second of which includes a core portion having a second insert section. The mold further comprises insert-positioning means, such as alignment pins, for positioning the insert in a predetermined position and orientation relative to the cavity portion. The mold halves should be configured so that, when the mold halves are in a closed position in which the core section extends within the cavity section, the first insert section of the cavity portion and the second insert section of the core portion are positioned in noncontacting adjacent relationship such that an insert portion is formed in the article in which the inner and outer walls of the article are at least partially contiguous. Also, the cavity and core portions are configured and positioned in adjacent, noncontacting relationship so as to form, respectfully, distinct outer and inner walls of the article. Preferably, the insert-positioning means comprises a plurality of alignment pins attached to the first mold half insert section.

BRIEF DESCRIPTION OF THE FIGURES

FIG. 3 is an enlarged partial view of the insert portion of the cover of FIG. 2.

FIG. 4 is a partial section view taken along lines 4—4 of FIG. 3.

FIG. 5 is a partial section view taken along lines 5—5 of FIG. 3.

FIG. 5A is a partial section view of the insert portion of the cover of FIG. 3 showing visible portions and runner sections of a nameplate insert.

FIG. 6 is a partial section view taken along lines 6—6 of FIG. 3.

FIG. 7 is a double sectioned perspective view of the insert portion of the cover of FIG. 2.

FIG. 8 is an exploded perspective view of an insert plate used within a cavity mold half to form the cover of FIG. 2.

FIG. 9 is a perspective view of the insert plate of FIG. 8 illustrating how a nameplate insert is supported and captured thereby.

FIG. 10 is a view of the mold insert plate of FIG. 9 with the name insert indicated in phantom line.

DETAILED DESCRIPTION OF THE PREFERRED EMBODIMENTS

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
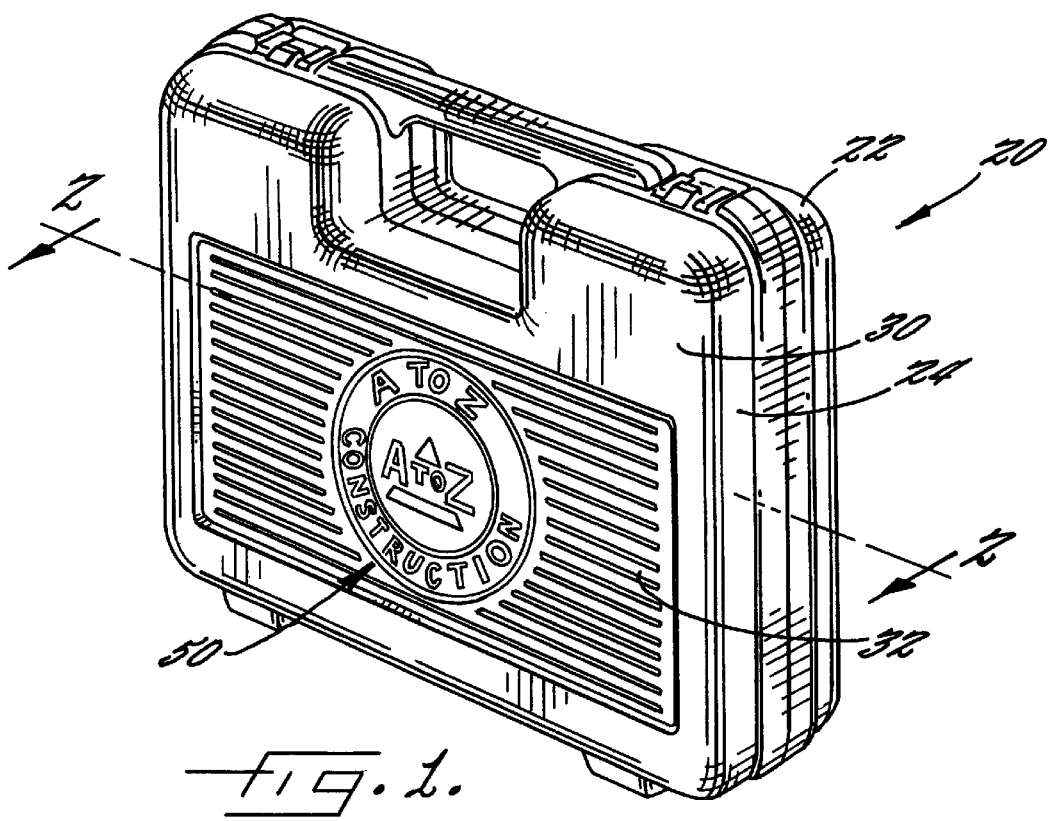
FIG. 1 is a perspective view of a carrying case of the present invention having a molded-in nameplate.

Referring first to FIG. 1, a carrying case, designated broadly at 20, comprises a container member 22 and a cover 24 that includes a nameplate insert 50. The container 22 and the cover 24 are double-walled blow-molded components. As used herein, a "double-walled" component is one which has been produced by blow molding and in which substantial portions of one wall of the component are adjacent but spaced away from substantial portions of an opposed wall. Preferably, the mold used to produce the component has distinct core and cavity halves and is configured to produce a component having the aforementioned full-perimeter flash.

The container 22 and cover 24 are pivotally interconnected at their lower facing edges by a hinge (not shown) that enables the container 22 and cover 24 to pivot relative to one another between closed and open positions. The configuration of the hinge is not critical; an exemplary hinge suitable for interconnecting double-walled blow-molded components is illustrated in U.S. Pat. No. 5,361,456 to Newby, the disclosure of which is hereby incorporated herein in its entirety. The illustrated carrying case 20 thus has a container cavity 25 (FIG. 2) that is configured to contain, transport, and protect a power tool, such as a power drill, but those skilled in this art will appreciate that a carrying case of the present invention can take a variety of configurations and protect any number of items, such as electronic, computer, video, or camera equipment, sales samples, and the like.

The cover 24 is formed of a thermoplastic material, preferably polyethylene, suitable for blow-molding. Other suitable materials include propylene, polystyrene, ABS, and copolymers thereof. It is preferred that the container 22 also be formed of a thermoplastic material and have a double-walled construction, although those skilled in this art will recognize that other materials and structures are also suitable for use in the container 22.

Figure 2:
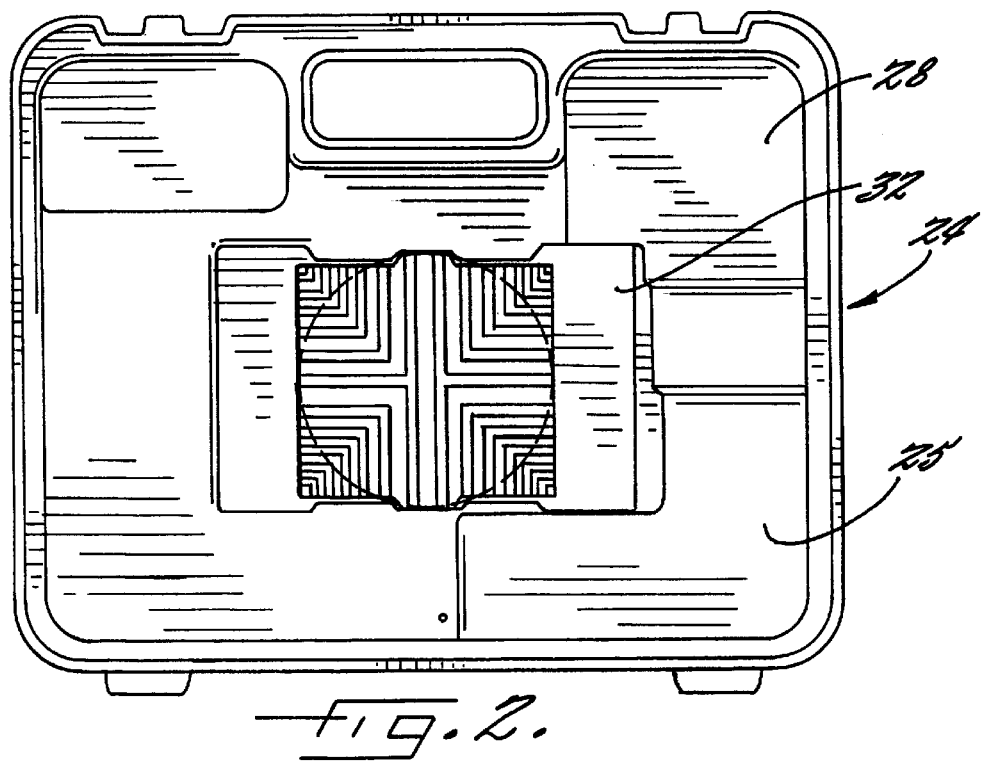
FIG. 2 is a view taken along lines 2—2 of FIG. 1 showing the inner wall of the carrying case cover.

Inasmuch as the cover 24 is of a double-walled construction, it includes a preferably textured outer wall 30 (seen in FIG. 1) and an inner wall 28 (seen in FIG. 2). In the illustrated embodiment, the inner and outer walls 28, 30 have a nominal thickness of between about 0.060 and 0.090 inches, although the skilled artisan will recognize that some variation in wall thickness typically occurs in blow-molded parts. The skilled artisan will further recognize that other nominal thicknesses may also be suitable for use with this invention, particularly if the cover 24 is formed of a different thermoplastic material.

As is conventional for components of double-walled construction, over much of the expanse of the cover 24 the inner wall 28 and outer wall 30 are adjacent to but spaced from one another. However, at an insert portion 32 (FIGS. 2 and 3), the inner wall 28 and outer wall 30 are at least partially contiguous. Because the insert portion 32 is formed of portions of both the inner and outer walls 28, 30, it has a thickness substantially greater than that of either wall 28, 30 alone. Preferably, the thickness is between about 0.200 and 0.300 inches.

On its inner surface 33, the insert portion 32 includes a plurality of ribs 34 (FIGS. 3 through 6). The ribs 34, which extend inwardly (i.e., toward the container portion 22 and into the container cavity 25 when the carrying case 20 is closed), are formed in a rectilinear pattern, with each rib 34 having perpendicular intersecting transverse sections 36 and longitudinal sections 38. The ribs 34 increase the strength and rigidity of the insert portion 32. Notably, each rib 34 includes a passageway 40 therein (FIGS. 4 through 7); these passageways 40 allow gas employed to inflate the blow molding parison used to create the cover 24 to escape from the insert portion 32 during molding rather than being trapped therein. Those skilled in this art recognize that, although the illustrated rectilinear ribbing pattern is preferred for the generally circular insert 50 illustrated herein, other ribbing patterns, such as that illustrated in FIGS. 15 and 16, may also be suitable for this and other embodiments of the present invention.

As noted above, the cover 24 includes a generally circular nameplate insert 50 (seen in FIG. 1 and in phantom line in FIG. 3) that can, for example, indicate the manufacturer of the item carried within the carrying case 20. As best seen in FIGS. 5A and 9, the nameplate insert 50 includes visible portions 52 (which comprise circular strips 56a, 56b and letters 57) that can be seen when the carrying case 20 is in a closed position, and further includes recessed runner sections 54 that interconnect the visible portions 52. The visible surfaces of the visible portions 52 together define an outer surface 53 which is substantially coplanar with the outer surface 31 of the cover outer wall 30. The runner sections 54 should be sufficiently recessed from the outer surface 53 of the visible portions 52 that thermoplastic material forming the insert portion 32 of the cover 24 can flow over the runner sections 54 and therefore embed them within the insert portion 32. It is preferred that the runner sections 54 be recessed from the visible portion outer surface 53 between about 0.075 and 0.100 inches; a recess of this magnitude should provide sufficient space between the wall of a mold and the runner sections 54 to enable such material flow. Those skilled in this art will recognize that an insert that includes visible portions interconnected by recessed runner sections but is of a different general shape, such as the generally rectangular shape illustrated in FIGS. 15 and 16 or a generally triangular, ovoid, or other polygonal shape, can also be included in a carrying case of the present invention.

The insert 50 is formed of a polymeric material, preferably a thermoplastic material, and should have sufficient thermal resistance and structural rigidity to maintain its shape when exposed to the molten thermoplastic used to form the cover 24. If the cover 24 is formed of polyethylene, it is particularly preferred that the insert be formed of polypropylene. It is also preferred that the insert 50 be injection molded, but it can be formed by other methods, such as machining, that produces a structure with visible portions and recessed runner sections.

Figure 11:
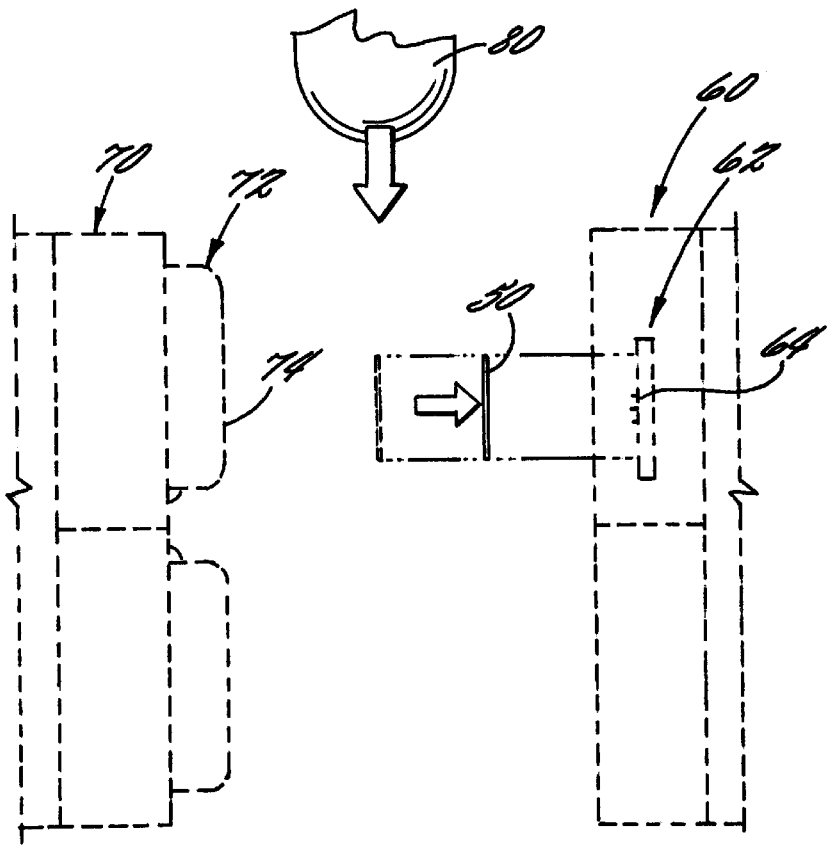
FIG. 11 is a side view of reciprocating mold halves used to form the carrying case illustrated in FIG. 1.

The process for producing the carrying case 20 can be best understood by reference to FIGS. 8 through 14. FIG. 11 schematically illustrates a pair of reciprocating mating mold halves 60, 70. The mold halves 60, 70 are mounted on and reciprocated within a blow-molding machine (not shown) of a type known to those skilled in this art. Such a molding machine includes an overhead, vertically-directed extrusion head (not shown) that can produce a tubular thermoplastic parison 80 (see FIGS. 11 and 12).

The mold half 60 includes a cavity portion 62 that is recessed from and within the frame of the mold half 60 itself. The cavity portion 62 includes contour and detail that is to be formed onto the outer wall 30 of the cover 24. An insert plate 64 (seen in detail in FIGS. 8 through 10) or other insert section is positioned within the cavity portion 62. Preferably, the insert plate 64 is detachable from the remainder of the cavity portion 62 so that other insert plates, such as those which can support different inserts or provide different textures, can be included in a carrying case of similar shape.

Five alignment pins 66 (FIGS. 8 and 9) extend from the insert plate 64. These alignment pins 66 are positioned to interact with specific portions of the nameplate insert 50 and thereby place it in a predetermined position and orientation relative to the cover 24. In this manner, the nameplate insert 50 is registered in the same position and orientation each time a carrying case 20 is formed in the mold. Those skilled in this art will recognize that other insert-positioning structures, such as clips, can also be used with the present invention. The present invention is also intended to encompass an insert having raised bumps or nodules that fit within recesses in the mold.

The cavity mold half 60 also includes a plurality of vents 68 (indicated as circular apertures in FIGS. 9 and 10). The positions of these vents 68 within the cavity portion 62 correlate with the positions of the visible portions 52 of the nameplate insert 50 as the nameplate insert 50 is supported on the alignment pins 66. These vents 68 are included to draw excess air away from the mold half 60 that might otherwise get trapped between the runner sections 54 of the nameplate insert 50 and the regions of the insert portion 64 adjacent thereto. Omission of the vents 68 can result in incomplete flow of thermoplastic material over the runner sections 54, thereby hindering incomplete embedment thereof within the insert portion 32 of the cover 24. It should be understood that the vents 68 can be passive or can have suction applied thereto as desired.

The mold half 60 further includes cooling lines 69 (illustrated schematically in FIG. 14) which remove heat from the mold half resulting from repeated contact with molten thermoplastic parisons. Those skilled in this art will recognize that other cooling line configurations are also suitable for use with the present invention.

The mold half 70 (FIGS. 11 and 12) includes a core portion 72 that extends away from the frame of the mold half 70 and toward the mold half 60. The core portion 72 and an insert section 74 thereof includes contour and detail for forming the inner wall 28 of the cover 24, with the insert section 74 being positioned opposite the cavity portion insert section 64. The mold half 70 also includes a cooling circuit 76 (FIG. 14) to remove heat generated by repeated contact with parisons.

To initiate a molding cycle, a nameplate insert 50 is placed within the mold half 60 in a preferred position and orientation on the alignment pins 66 (FIGS. 10 and 11). The outer surface 53 of the nameplate insert 50 is positioned to be flush with the insert plate 64, thereby preventing material from flowing over the outer surface 53 and embedding portions thereof within the cover 24. As a result, the runner sections 54 are positioned between about 0.075 and 0.100 inches from the insert plate 64.

Figure 12:
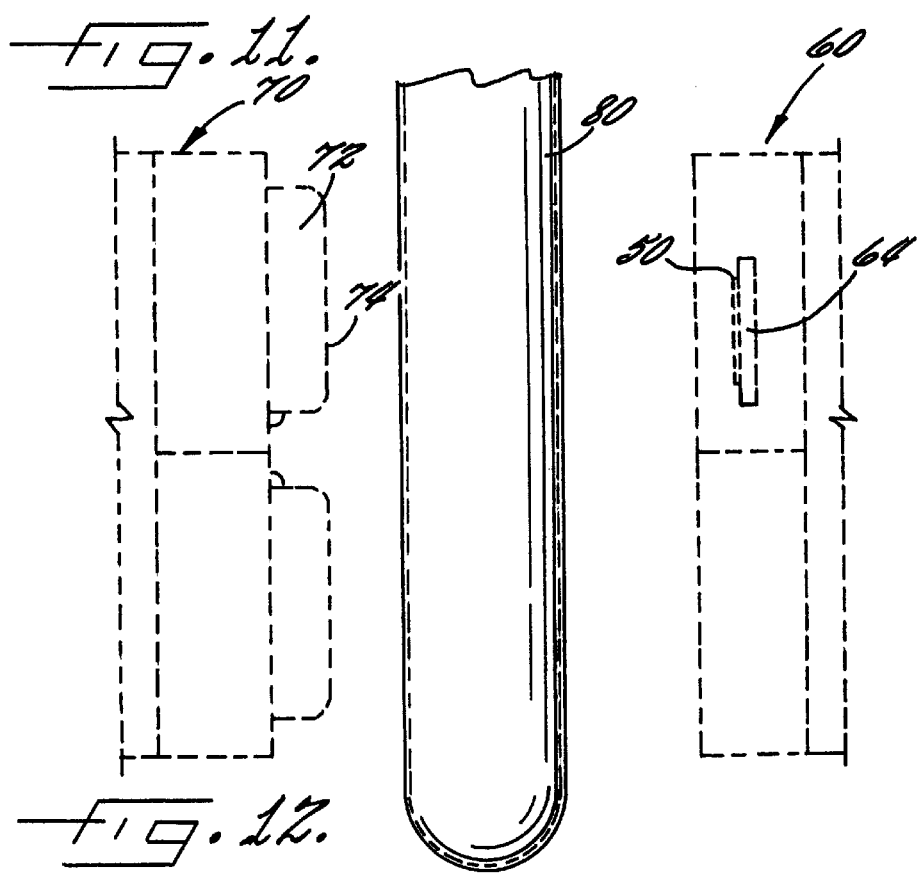
FIG. 12 is a side view of the mold halves of FIG. 11 having a thermoplastic parison lowered therebetween.
Figure 13:
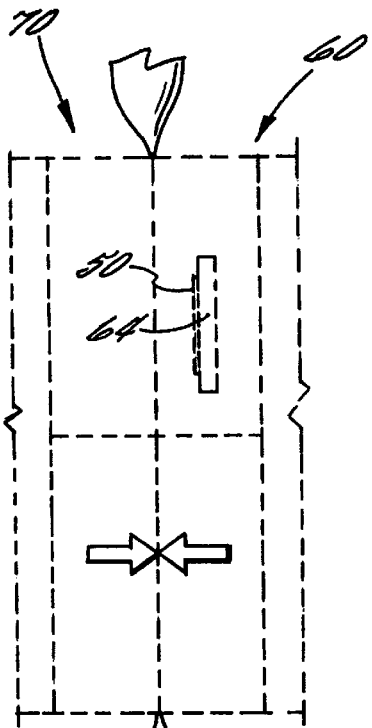
FIG. 13 is a side view of the mold halves of FIG. 11 in a closed position.
Figure 14:
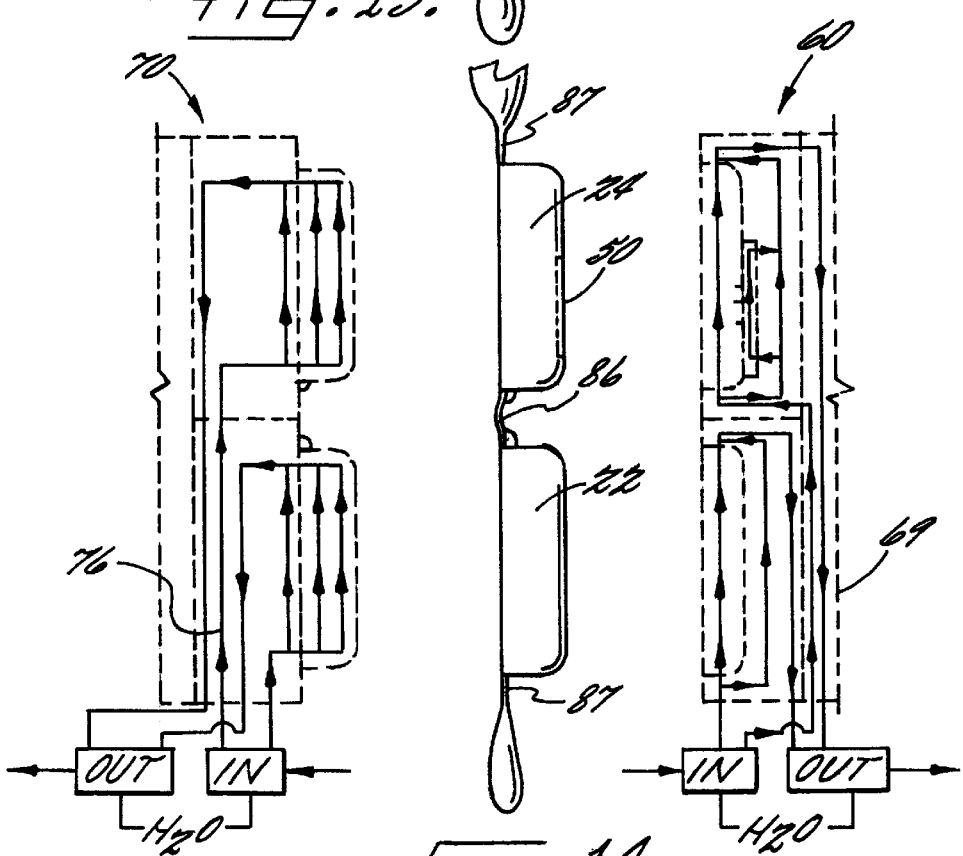
FIG. 14 is a view of the mold halves of FIG. 11 in an open position, wherein the part has been ejected therefrom.

After the nameplate insert 50 has been positioned, a parison 80 of thermoplastic material is lowered from the extrusion head to a position between the mold halves 60, 70 (FIG. 12). Once the parison 80 has reached a position between the mold halves 60, 70, the mold halves 60, 70 close upon it (FIG. 13). This action pinches the parison 80 at its top and bottom portions and at lateral portions therebetween, thereby forming the aforementioned full-perimeter flash. In addition, a gas is introduced into the parison 80 through an inlet (not shown) in the extrusion head. Injection of this gas (preferably air or nitrogen) inflates the parison, which in turn forces the parison 80 against the cavity portion 62 and the core portion 72 of the mold halves 60, 70. As the thermoplastic material takes the shape of the cavity portion 62 and the core portion 72, some of the material flows into the spaces between the insert runner sections 54 and the insert plate 64. The vents 68 remove air that would otherwise be trapped by the approaching material flow fronts. The mold halves 60, 70 remain closed until the thermoplastic material has cooled sufficiently to be handled without affecting its new configuration. The mold halves 60, 70 then open, and the carrying case 20 is ejected (FIG. 14).

Notably, the mold halves 60, 70 are configured so that the container 22 is molded simultaneously with the cover 24. This dual molding process is preferred, as the appearance of these parts, which can vary slightly based on material lot, mold temperature, mold aging, and other factors, should more closely match one another. After molding, the container 22 and cover 24, which spaced apart by a section of flash material 86, are separated and assembled. Also, sections of flash material 87 that extend from the upper edge of the cover 24, the lower edge of the container 22, and the lateral edges of each are also removed.

In addition to having a pleasing aesthetic appearance, the carrying case 20 has distinct performance advantages over prior labeled carrying cases. Because the insert 50 is actually molded into, and therefore is an integral part of, the cover 24, the insert 50 is extremely durable. Indeed, the insert 50 is as durable as the cover 24 itself. As a result, the manufacturer need not be concerned with the longevity of the label in order to identify the source of a particular product. The longevity of the insert 50 is typically far greater than that of an adhered label, which not only can be inadvertently peeled from the surface of the carrying case cover, but also can simply disintegrate over time.

In addition, the configuration of the insert portion 32 provides the designer of the carrying case 20 with significant design flexibility. Because the insert portion 32 has a wall thickness of approximately twice that of the remainder of the outer wall 30, it is considerably more rigid than these remaining regions. As a result, the insert portion 32 has sufficient rigidity that embedding an insert 50 of a different thermoplastic material which may have different shrinkage characteristics does not cause the insert portion 32 to bow or deform significantly as the cover 24 shrinks after molding. Consequently, both the insert portion 32 and the insert 50 remain relatively flat after molding and cooling. Preferably, the insert 50 has a flatness of between about 0.030 and 0.100 inches/inch. The ribs 34 can further enhance the flatness of the insert portion 32 while also providing an escape route for gas trapped within the parison 80. The final product can thus have a substantially flat surface that contains a nameplate or other insert while returning the forementioned advantages inherent to a double-walled blow molded component.

Figure 15:
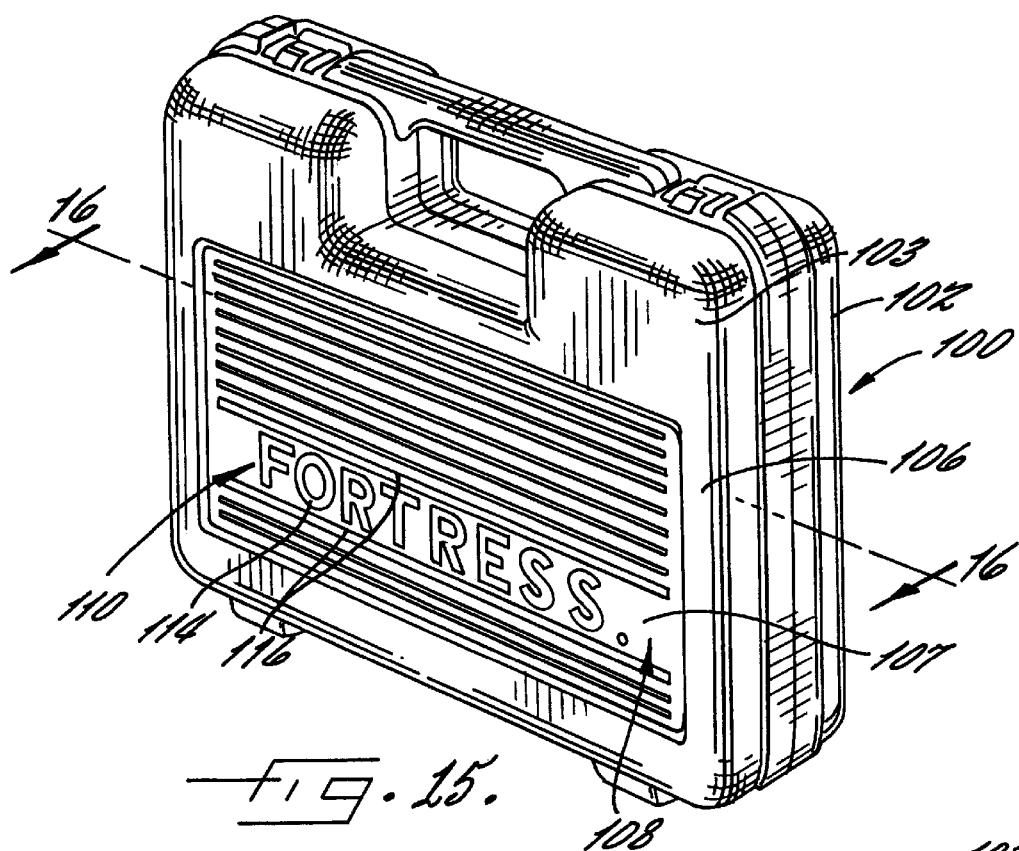
FIG. 15 is a perspective view of an alternative embodiment of a carrying case of the present invention having a molded in nameplate.
Figure 16:
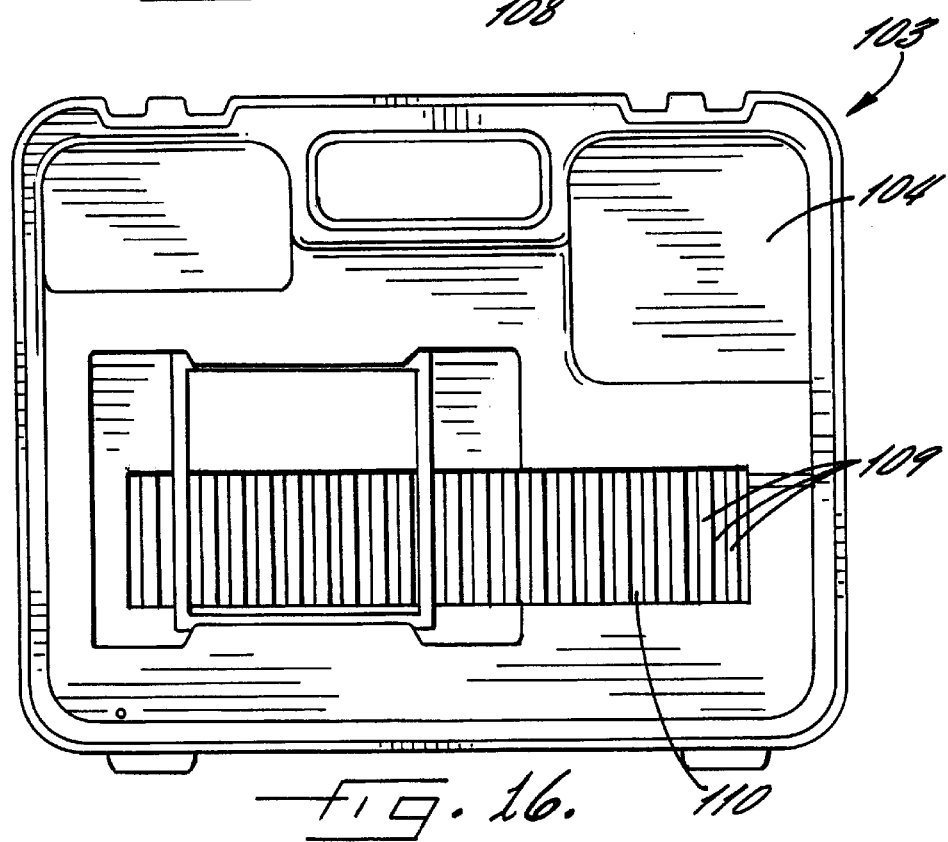
FIG. 16 is a view of the carrying case of FIG. 15 taken along lines 15—15.

An alternative embodiment of the present invention is illustrated in FIGS. 15 and 16. A carrying case, designated broadly at 100, includes a container member 102 and a cover member 103 similar to that of the earlier illustrated embodiment. The descriptions hereinabove regarding the materials of construction and wall thicknesses for the carrying case 20 are equally applicable for the carrying case 100. As the cover member 103 is a double-walled blow molded component, it includes an inner wall 104 and an outer wall 106. The inner wall 104 and outer wall 106 are contiguous at an insert portion 107, which includes ribs 109 on its inner surface.

The cover 103 includes a generally rectangular nameplate insert 110 positioned within the insert portion 107. The nameplate insert 110 includes visible portions 112 which comprise letters 114 and stripes 116. The letters 114 and stripes 116 are interconnected by recessed runner sections (not shown). The letters 114 and stripes 116 define an outer surface 118 that is substantially coplanar with the outer surface 108 of the outer wall 106.

Referring now to FIG. 16, it can be seen that the ribs 109 protruding from the inner wall 104 are generally straight and are oriented so as to be generally perpendicular to the longer dimension of the nameplate insert 110. As with the ribs 34 of the earlier illustrated embodiment, the ribs 109 include passageways (not shown) which allow gas trapped within the molding parison to escape. The ribs 109 also provide stiffness to the insert portion 107 so that the insert portion 107 can remain substantially flat despite the differential shrinkage of the cover 103 and the insert 110.

Those skilled in the art will recognize that the carrying case 100 of FIGS. 15 and 16 can be formed with the mold halves 60, 70 illustrated in FIGS. 11 through 14. However, an insert plate would replace the insert plate 64 illustrated therein. The replacement insert plate would include alignment pins or other insert-positioning means to ensure that the nameplate insert 110 is properly positioned and oriented relative to the cover member 103.

The foregoing embodiments are illustrative of the present invention, and are not to be construed as limiting thereof. The invention is defined by the following claims, with equivalents of the claims to be included therein.

That which is claimed is:

1. A method for forming a double-walled thermoplastic article having a molded-in insert, the double-walled article having an outer wall and an inner wall, said method comprising the steps of:

providing a polymeric insert comprising a plurality of spaced apart visible portions that define an outer surface and a plurality of runner sections between the visible portions which are recessed from the insert outer surface;

providing a mold comprising a pair of mating mold halves, a first of said mold halves including a cavity portion having a first insert section, and a second of said mold halves including a core portion having a second insert section;

positioning the insert within the first insert section of the cavity portion of the first mold half so that the insert outer surface contacts the first insert section and so that the recessed portions are spaced away from the first insert section;

lowering a molten thermoplastic parison between the mold halves;

closing the mold halves to capture a portion of the parison therebetween so that the core portion of the second mold half extends within the cavity portion of the first mold half; and inflating the parison to force the parison to contact the core and cavity portions of the mold halves such that the thermoplastic flows into the space between the runner sections and the first insert section so that the runner sections of the insert are embedded within the inflated parison and the plurality of insert visible portions are exposed upon removal of the double-walled article from the mold;

wherein the cavity and core portions of the first and second mold halves and the parison are configured so that, after said inflating step, the inner and outer walls of the article are at least partially contiguous.

2. The method defined in claim 1, further comprising the step of:

venting air contained within the mold after said closing step.

3. The method defined in claim 2, wherein said venting step comprises venting air from locations within the mold adjacent the insert visible portions.

4. The method defined in claim 1, wherein said core portion is configured to form a plurality of ribs in said article insert portion extending from said article inner wall.

5. The method defined in claim 4, wherein the plurality of ribs are configured to include hollow passageways so that so that gas employed in said inflating step flows away from the ribs.

6. The method defined in claim 1, wherein the parison is formed of a first thermoplastic material, and the insert is formed of a second thermoplastic material, the second thermoplastic material differing from the first thermoplastic material.

7. The method defined in claim 6, wherein the first thermoplastic material is polyethylene, and wherein the second thermoplastic material is polypropylene.

8. The method defined in claim 1, wherein the cavity and core portions of the first and second mold halves and the parison are configured so that, during said closing step, the first insert section of the cavity portion and the second insert section of the core portion are positioned in adjacent, noncontacting relationship so that an insert portion is formed in the article which includes the insert and in which the inner and outer walls of the article are at least partially contiguous.

9. The method defined in claim 1 wherein, when the parison is removed from the mold, the plurality of visible portions are exposed through the outer wall such that the visible portions are visible from a single vantage point from which the outer wall is also visible.

10. The method defined in claim 9 wherein the first insert section is configured such that, following said step of inflating, the insert outer surface and at least a portion of the outer wall immediately adjacent the insert outer surface are substantially coplanar and positioned on a substantially flat portion of the outer wall.

11. The method defined in claim 6 wherein the second thermoplastic material has sufficient thermal resistance and structural rigidity to maintain its shape when exposed to the first thermoplastic material when the first thermoplastic material is in a molten state.

12. A method for forming a double-walled thermoplastic article having a molded-in insert, the double-walled article having an outer wall and an inner wall, said method comprising the steps of:

providing a polymeric insert comprising a plurality of spaced apart visible portions that define an outer surface and a plurality of runner sections between the visible portions which are recessed from the insert outer surface, the insert formed of a first thermoplastic material;

providing a mold comprising a pair of mating mold halves, a first of said mold halves including a cavity portion having a first insert section, and a second of said mold halves including a core portion having a second insert section;

positioning the insert within the first insert section of the cavity portion of the first mold half so that the insert outer surface contacts the first insert section and so that the recessed portions are spaced away from the first insert section;

lowering a molten thermoplastic parison between the mold halves, the parison being formed of a second thermoplastic material, the second thermoplastic material differing from the first thermoplastic material;

closing the mold halves to capture a portion of the parison therebetween so that the core portion of the second mold half extends within the cavity portion of the first mold half; and inflating the parison to force the parison to contact the core and cavity portions of the mold halves such that the thermoplastic flows into the space between the runner sections and the first insert section so that the runner sections of the insert are embedded within the inflated parison and the plurality of insert visible portions are exposed upon removal of the double-walled article from the mold;

wherein the cavity and core portions of the first and second mold halves and the parison are configured so that, during said closing step, the first insert section of the cavity portion and the second insert section of the core portion are positioned in adjacent, noncontacting relationship so that an insert portion is formed in the article which includes the insert and in which the inner and outer walls of the article are at least partially contiguous.

13. The method defined in claim 12, wherein said core portion is configured to form a plurality of ribs in said article insert portion extending from said article inner wall.

14. The method defined in claim 12, wherein the first thermoplastic material is polyethylene, and wherein the second thermoplastic material is polypropylene.

15. A method for forming a double-walled thermoplastic article having a molded-in insert, the double-walled article having an outer wall and an inner wall, said method comprising the steps of:

providing a polymeric insert comprising a plurality of spaced apart visible portions that define an outer surface and a plurality of runner sections between the visible portions which are recessed from the insert outer surface;

providing a mold comprising a pair of mating mold halves, a first of said mold halves including a cavity portion having a first insert section, and a second of said mold halves including a core portion having a second insert section;

positioning the insert within the first insert section of the cavity portion of the first mold half so that the insert outer surface contacts the first insert section and so that the recessed portions are spaced away from the first insert section;

lowering a molten thermoplastic parison between the mold halves;

closing the mold halves to capture a portion of the parison therebetween so that the core portion of the second mold half extends within the cavity portion of the first mold half; and inflating the parison to force the parison to contact the core and cavity portions of the mold halves such that the thermoplastic flows into the space between the runner sections and the first insert section so that the runner sections of the insert are embedded within the inflated parison and the plurality of insert visible portions are exposed upon removal of the double-walled article from the mold;

wherein the cavity and core portions of the first and second mold halves and the parison are configured so that, during said closing step, the first insert section of the cavity portion and the second insert section of the core portion are positioned in adjacent, noncontacting relationship so that an insert portion is formed in the article which includes the insert and in which the inner and outer walls of the article are at least partially contiguous;

wherein, when the double-walled article is removed from the mold, the plurality of visible portions are exposed through the outer wall such that the visible portions are visible from a single vantage point from which the outer wall is also visible.

16. The method defined in claim 15 wherein the first insert section is configured such that, following said step of inflating, the insert outer surface and at least a portion of the outer wall immediately adjacent the insert outer surface are substantially coplanar and positioned on a substantially flat portion of the outer wall.

17. A method for forming a double-walled thermoplastic article having a molded-in insert, the double-walled article having an outer wall and an inner wall, said method comprising the steps of:

providing a polymeric insert comprising at least one visible portion that defines an outer surface and at least one embeddable section connected to said visible portion which is recessed from the insert outer surface;

providing a mold comprising a pair of mating mold halves, a first of said mold halves including a cavity portion having a first insert section, and a second of said mold halves including a core portion having a second insert section;

positioning the insert within the first insert section of the cavity portion of the first mold half so that the insert outer surface contacts the first insert section and so that the embeddable section is spaced away from the first insert section;

lowering a molten thermoplastic parison between the mold halves;

closing the mold halves to capture a portion of the parison therebetween so that the core portion of the second mold half extends within the cavity portion of the first mold half; and inflating the parison to force the parison to contact the core and cavity portions of the mold halves such that the article inner wall is formed by the cavity portion and the article outer wall is formed by the core portion, and such that the thermoplastic flows into the space between the embeddable sections and the first insert section so that the embeddable sections of the insert are embedded within the inflated parison and the insert visible portion is exposed upon removal of the double-walled article from the mold;

wherein the cavity and core portions of the first and second mold halves and the parison are configured so that, after said inflating step, the inner and outer walls of the article are at least partially contiguous.

18. The thermoplastic article of claim 17, wherein the contiguous portions of the inner and outer walls form an article insert portion in which said insert is located.

19. The thermoplastic article of claim 18, wherein said article insert portion includes a plurality of ribs extending from said body inner surface.

20. The thermoplastic article of claim 19, wherein at least some of said plurality of ribs include venting passageways therein.

21. The thermoplastic article of claim 17, wherein said article insert portion outer surface and said insert outer surface are substantially coplanar and are positioned on a substantially flat portion of said body.

22. The thermoplastic article of claim 17, wherein said at least one visible portion is a plurality of visible portions, and said at least one embeddable portion is a plurality of embeddable portions.

23. The thermoplastic article of claim 22, wherein said embeddable sections are runner sections extending between visible portions of said insert.

* * * * *

UNITED STATES PATENT AND TRADEMARK OFFICE
CERTIFICATE OF CORRECTION

PATENT NO. : 6,123,893
DATED : September 26, 2000
INVENTOR(S) : John Parks Newby, Sr.

It is certified that error appears in the above-identified patent and that said Letters Patent is hereby corrected as shown below:

Claim 5, column 9, line 29-30 please delete second "so that".

Signed and Sealed this

Fifteenth Day of May, 2001

*Attest:*

NICHOLAS P. GODICI

*Attesting Officer*      *Acting Director of the United States Patent and Trademark Office*